Dec. 28, 1943.   J. A. ACS, JR   2,337,535
WARNING INDICATOR FOR THE INSTRUMENT PANELS
OF AIRPLANES AND THE LIKE
Filed Feb. 20, 1941
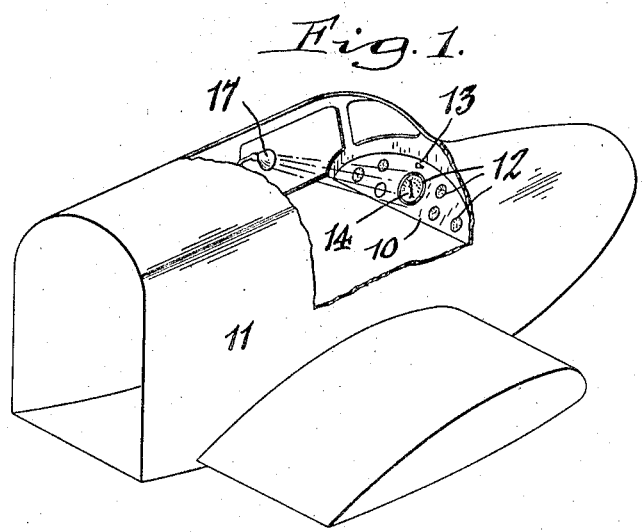
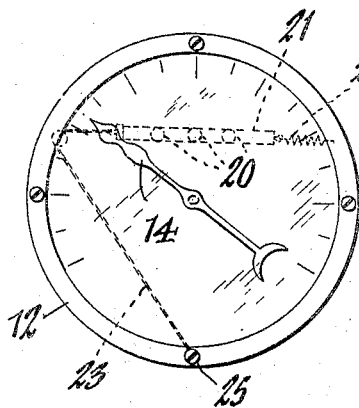
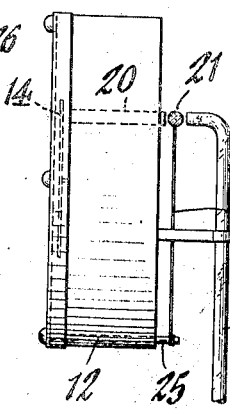
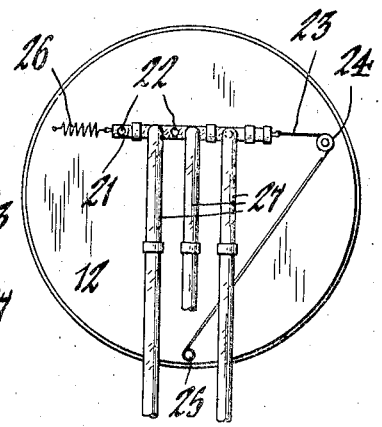
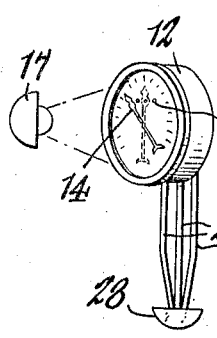
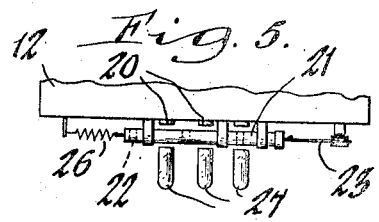
Inventor,
John A. Acs, Jr.,
by Walter P. Geyer
Attorney.

Patented Dec. 28, 1943

2,337,535

UNITED STATES PATENT OFFICE 2,337,535

WARNING INDICATOR FOR THE INSTRUMENT PANELS OF AIRPLANES AND THE LIKE

John A. Acs, Jr., Buffalo, N. Y., assignor of fifty-one one-hundredths to Eugene M. Braun and Auraldo W. Bond, both of Buffalo, N. Y., jointly Application February 20, 1941, Serial No. 379,802

4 Claims. (Cl. 250—41.5)

This invention relates generally to visual indicators and more particularly to a warning indicator for the instrument panels of airplanes whereby the pilot is warned by the flashing of a light or like visual element whenever one or another of the several instruments on the instrument panel registers an abnormal condition while the airplane is in flight.

One of the objects of the invention is to provide a light-controlled indicator system of this character which is positive and reliable in operation and wherein the pilot is promptly forewarned of any abnormal conditions which are registered on the instrument panel and which he may not otherwise observe until it is too late to correct.

Another object is to provide a warning indicator attachment for instruments of the character referred to which is readily adjustable to suit the warning requirements of a given instrument.

Other features of the invention reside in the construction and arrangement of parts hereinafter described and particularly pointed out in the appended claims.

In the accompanying drawing:

Figure 1 is a fragmentary perspective view of an airplane showing the instrument panel thereof. Figure 2 is a face view of one of the flight control instruments of an airplane showing my invention operatively connected thereto. Figure 3 is a rear view of the same. Figure 4 is a side elevation, partly in section. Figure 5 is a fragmentary top plan view showing the disposition of the indicator mechanism relative to the instrument. Figure 6 is a diagrammatic view showing the control circuit of the invention.

Similar characters of reference indicate corresponding parts throughout the several views.

By way of example, my invention has been shown as applied to the instrument panel 10 of an airplane 11, such panel being equipped with a plurality of flight control instruments 12 which are usually employed for enabling the pilot to observe the various conditions of the airplane while in flight. Also applied to the instrument panel is a warning light 13 which, in accordance with my invention, is adapted to be lighted whenever any one of the flight control instruments registers an abnormal condition while the airplane is in flight, thereby flashing notice to the pilot the moment such an abnormal condition arises so that he may take such measures as may be deemed necessary to correct the abnormality the moment it takes place and thereby avert any resulting dangers which might otherwise occur.

For the purpose of carrying out these results, each of the instruments 12, or those registering the airplane's condition of flight, is provided with a means operatively associated with and governed by the movable pointer or indicator 14 of the instrument for automatically controlling the closing of a pair of switch contacts 15 of a circuit 16 including the lamp 13. In connection with this means I employ a lamp 17 located at a convenient point in the pilot's cabin of the airplane for directing a ray of light on the instrument panel, the light rays being normally transmitted to a photo electric cell 18 or the like for in turn governing an electrical controlled unit, indicated generally at 19, which operates to maintain the lamp switch 15 open, but which, when such light rays are shut off or intercepted by the instrument-pointer 14, as when the particular airplane control registered by such instrument reaches a danger position thereon, is adapted to cause the electrically-controlled unit to function in a manner to close such switch and light the warning lamp 13.

The means governed by the instrument-pointer 14 and the light rays emanating from the lamp 17 for controlling the switch 15 is in the form of an attachment applied to each instrument 12 and preferably constructed as follows:

Extending transversely through the body of the instrument 12 from the front face to the rear side thereof are one or more light-transmitting elements 20 which may be arranged in a horizontal row, as shown in Figure 2, and disposed across the path of travel of the instrument-pointer 14 and more particularly in that zone of travel which would be the danger zone or that zone in which the flight control registered by the instrument would indicate an abnormal condition and one in which the pilot should be warned. By way of example, three of these light-transmitting elements have been shown in the drawing and extending transversely across the rear ends of these elements is an opaque bar 21 having openings 22 therein corresponding in number to the elements 20 and so spaced lengthwise of the bar to register one at a time with one or another of such elements to enable the light rays emanating from the lamp 17 to travel through one of the elements 20 and thence through an alined opening 22 in the bar. This bar is guided in any suitable manner on the rear side of the instrument 12 and is adjustable transversely across the ends of elements 20 so as to enable it to be set with one of its openings 22 in alinement with its companion light-transmitting element, and for this purpose one end of this bar is connected to a cable 23 passing around a pulley 24 and connected at its free end to an adjusting screw 25, the other end of the bar being connected to a coil spring 26. By this construction, when the screw is turned in one direction or the other, the bar 21 is shifted in one direction or the other to register one of its holes with one of the companion light-transmitting elements 20. For any given adjustment of this bar the remaining holes thereof are out of register with any of the light-transmitting elements, as can be clearly seen in Figure 3.

Alined with the elements 20 and leading from the rear side of the bar 21 are companion light-transmitting elements 27 suitably supported on the instrument 12 and joined at their opposite ends in light-transmitting communication with a lens 28 which is disposed in operative relation to the photoelectric cell 18. The latter is connected to an amplifier unit 29 which in turn is connected to the lamp-governing unit 19, which may be in the form of a relay 30 whose armature 31 is normally open across the switch points 15, when the relay is energized, and is adapted to be closed across such switch points to light the warning lamp 13 when the relay is deenergized, as when the instrument-pointer 14 registers with a given light-transmitting element 20 to block off the light and prevent its striking the photo cell 18. It will be understood that the electric circuit including the photo cell, amplifier 29 and relay 30 is closed as long as a ray of light is imposed on the photo cell, and that at such times the lamp-circuit 16 is open. When, however, the pointer 14 reaches a danger or warning position on the instrument 12, such a condition will be recorded at the photo cell because of a blocking out of the light rays thereto by the pointer with the result that the circuit controlled by such cell is opened while the lamp circuit is automatically closed to light the lamp 13 and thereby give a visible warning to the pilot that the companion airplane-appurtenance registered by that instrument is not in normal order. Each instrument on the panel 10 is similarly connected to a photo electric cell and relay unit to give the pilot the warning sign.

While the invention has been shown by way of example in connection with the controls of airplanes, it is understood that the same is also applicable to various other controls which are recorded on instruments or the like. Furthermore, the light-transmitting elements 20 and 27 are preferably made of "Lucite" strips.

I claim as my invention:

1. A warning indicator system for use with instruments having a dial and a traversing pointer, comprising an electric circuit including a normally open switch, a light-transmitting element adapted for connection to said instrument and exposed at one end on the dial face of the latter in the path of travel of its pointer, light-intercepting means disposed between the opposing ends of and in adjustable relation to said light-transmitting element for rendering it operative or inoperative, said pointer extending over the exposed end of the light-transmitting element when the same registers an abnormal condition to intercept the passage of light to said element, and light-ray controlled means stationed remotely from the instrument in light-communicating relation with the other end of said light-transmitting element and operatively connected to said switch for closing the same whenever the pointer reaches a position in intercepting relation to said light-transmitting element.

2. A warning indicator system for use with instruments having a dial and a traversing pointer, comprising an electric circuit including a normally open switch, a plurality of light-transmitting elements adapted for connection to said instrument and exposed at one end on the dial face of the latter in the path of travel of its pointer, means adjustable transversely between the opposing ends of said elements for selectively rendering one of them subject to light transmission at any one time, and light-ray controlled means operatively interposed between the other end of said light-transmitting elements and said switch for governing the automatic closing of the latter when the pointer reaches a position in intercepting relation to that element subject to light transmission.

3. A warning indicator system for use with instruments having a dial and a traversing pointer, comprising an electric circuit including a normally open switch, a plurality of light-transmitting elements adapted for connection to said instrument and exposed at one end on the dial face of the latter in the path of travel of its pointer, said elements being divided intermediate their ends to provide an alined space therebetween, a light-intercepting member guided for adjustable movement in such space and having openings therein registrable one at a time with one or another of said light-transmitting elements, and light-ray controlled means operatively interposed between the other end of said elements and said switch for governing the automatic closing of the latter when the pointer reaches a position in intercepting relation to that element subject to light transmission.

4. A warning indicator system for use with instruments having a dial and a traversing pointer, comprising an electric circuit including a normally open switch, a plurality of light-transmitting elements adapted for connection to said instrument and exposed at one end on the dial face of the latter in the path of travel of its pointer, said elements being divided intermediate their ends to provide an alined space therebetween, a light-intercepting member guided for adjustable movement in such space and having openings therein registrable one at a time with one or another of said light-transmitting elements, means connected to said member for adjusting it to one position or another with one of its openings in registering alinement with a companion light-transmitting element, and light-ray controlled means operatively interposed between the other end of said elements and said switch for governing the automatic closing of the latter when the pointer reaches a position in intercepting relation to that element subject to light transmission.

JOHN A. ACS, Jr.